April 18, 1939.   J. K. POLHEMUS   2,154,958
VIEW FINDER FOR CAMERAS
Filed Dec. 1, 1937

INVENTOR.
JOHN K. POLHEMUS
BY Philip S. Hopkins
ATTORNEY.

Patented Apr. 18, 1939

2,154,958

UNITED STATES PATENT OFFICE 2,154,958

VIEW FINDER FOR CAMERAS

John K. Polhemus, Binghamton, N. Y., assignor to Agfa Ansco Corporation, Binghamton, N. Y., a corporation of New York Application December 1, 1937, Serial No. 177,572

4 Claims. (Cl. 88—1.5)

This invention relates to improvements in view finders for cameras and more particularly to a mounting for view finders associated with cameras.

One object of this invention is the provision of a mounting for a view finder which is durable in construction, simple to manufacture and easy to assemble.

An additional object is the provision of an improved mounting for view finders wherein a minimum of readily formed, easily assembled parts are utilized.

A further object is the provision of a view finder mounting wherein the parts may be readily secured in related assembly and rigid relation with the camera with a minimum of assembly operations.

Other objects will in part be obvious and in part be pointed out hereinafter.

Figure 1:
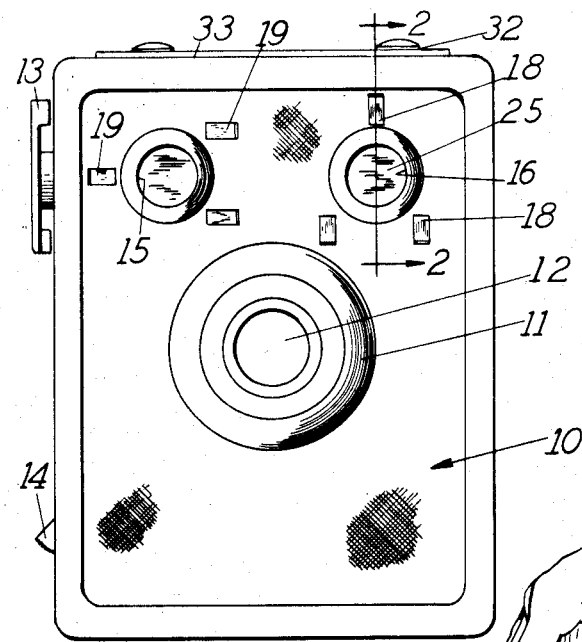
Figure 2:
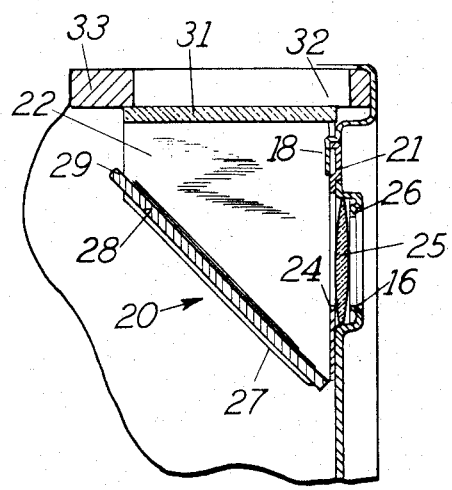
Figure 3:
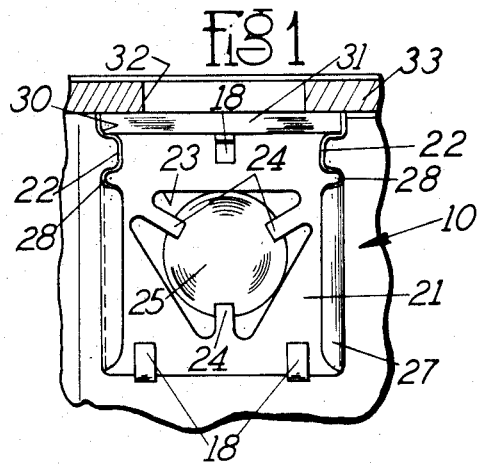
Figure 4:
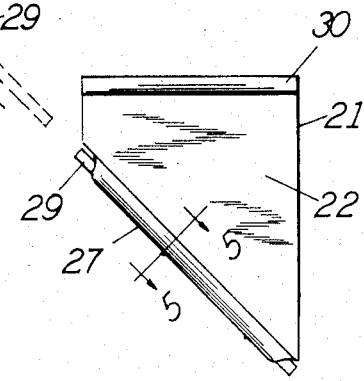
Figure 5:
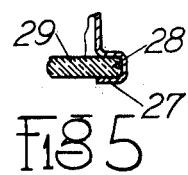

The invention accordingly consists in the combinations of elements, arrangements of parts and features of construction all as will be more fully pointed out hereinafter, and disclosed in the accompanying drawing wherein:

Figure 1 is a front elevational view of a camera disclosing a pair of view finders mounted thereon by means of the mounting of the instant invention, Figure 2 is an enlarged sectional view taken substantially along the line 2—2 of Figure 1 as viewed from the left, Figure 3 is an inside rear plan view of the device as shown in Figure 2 as viewed from the left, certain parts thereof being omitted, Figure 4 is a side elevational view of a portion of the mechanism of the instant invention disclosing the method of assembly of certain parts, and Figure 5 is an enlarged sectional view taken along the line 5—5 of Figure 4 as viewed from the upper left.

Similar reference characters refer to similar parts throughout the several views of the drawing.

Having reference now to Figure 1 there is generally indicated at 10 a camera front provided with lens opening 12 and lens and shutter assembly 11. A conventional film winding device is shown at 13 and a shutter operating lever at 14. Two apertures 15 and 16 are provided in the front 10 behind which apertures are positioned the view finders comprising the instant invention. The view finders are substantially identical except that one is positioned to permit a view from the top of the camera of the image to be photographed and the other to permit a view from the side of the camera of an image to be photographed. Therefore, hereinafter, the mounting of the structure of only one of these view finders will be described.

As best shown in Figure 1, a plurality of tongues 18 are struck from the material comprising the front of the camera. Three of these are adapted to hold one view finder generally indicated at 20 in related assembly with the camera. Three other tongues 19 are adapted to hold the other similar view finder in related assembly with the camera. Tongues 18 engage, as is best shown in Figure 3, opposite sides of a plate 21 provided with rearwardly turned side portions 22. Thus plate 21 and side portions 22 may be formed of a single integral metal stamping. Plate 21 is provided with an aperture 23 substantially triangular in configuration and provided at its angles with a plurality of inwardly extending tongues 24 which extend to a point closely adjacent but not within the periphery of aperture 16. In assembly with the device a view finder lens 25 is positioned adjacent a flange 26 formed about the periphery of aperture 16 in front plate 21, and then secured by tongues 24 in position adjacent aperture 16. When tongues 18 are positioned to overlie plate 21, it will then be seen that tongues 24 serve to hold lens 25 in its proper position with respect to aperture 16 (see Figure 3).

Side portions 22 have lower edges 27 disposed in angular relation to the rear surface of front plate 10. Edges 27 have preformed grooves 28 therein, oppositely disposed with respect to each other. A suitable reflecting surface 29 which may be of polished metal or mirror glass is adapted to be slid into grooves 28 in the manner disclosed in Figure 4.

The upper edges of side plate 22 are provided with channels 30 adapted for the reception of ground glass 31 positioned, when the camera is assembled, adjacent an aperture 32 in the upper portion 33 of the camera (see Figure 2).

Now from the foregoing the mounting of the view finder should be readily understandable. As above stated lens 25 is first positioned in the recess formed by flange 26 adjacent aperture 16. View finder 20 is then positioned on front 10 and tongues 18 are bent inwardly with respect to plate 21 to hold the same and hence view finder 20 in related assembly. Reflecting surface 29 is then inserted in groove 28 and ground glass 31 positioned in channel 30. The front of the camera is then assembled with respect to side portions thereof and top portion 33 in such manner that top portion 33 of the camera holds ground glass 31 securely in channels 30 and aperture 32 is adjacent ground glass 31.

Thus from the foregoing it will be seen that there is herein provided a structure which accomplishes all the objects of this invention, and others, including many advantages of great practical utility, particularly in respect to simplicity of construction and assembly.

As many embodiments may be made of the inventive concept herein shown and described and as many modifications may be made in the embodiment hereinbefore set forth, it is to be understood that all matter hereinbefore described or shown in the accompanying drawing is to be interpreted merely as illustrative and not in a limiting sense.

I claim as my invention:

1. In a device of the character described in combination, a camera front having an aperture therein, tongues struck from said front adjacent said aperture, a plate having an aperture therein adapted to be held interiorly of said camera adjacent said front by said tongues, said apertures being aligned, tongues formed integral with said plate adjacent said aperture in said plate, a lens secured between said aligned apertures by said second mentioned tongues, said plate having inturned portions provided with aligned grooves, angularly disposed with respect to said front, and reflecting means positioned in said grooves.

2. In a device of the character described in combination, a camera comprising a front having an aperture therein, and a side having an aperture therein, tongues struck from said front adjacent said aperture, a plate having an aperture therein adapted to be held adjacent said front by said tongues, said first and third apertures being in alignment, tongues formed integrally with said plate, adjacent said aperture in said plate; a lens positioned between said first and third apertures and held in position by said second mentioned tongues, said plate having inturned portions, integral therewith and provided with aligned grooves angularly disposed with respect to said plate, reflecting means positioned in said grooves, means forming channels in the upper extremity of said inturned portions, and a ground glass positioned in said channels adjacent said second mentioned apertures.

3. In combination with a camera having a view finder aperture therein, a view finder comprising a sheet metal member, having a front portion and two integral side portions, the lower edges of said side portions being cut away and channeled to form aligned grooves in angular relationship to said front portion and the upper edges of said side being bent to form aligned channels angularly disposed with respect to said grooves, and in substantially right angular relationship to said front portion, said front portion having an aperture therein, tongues integral with said member protruding into said aperture, and a lens positioned between said aperture in said front portion and said aperture in said camera, said tongues serving to hold said lens in position when said view finder is secured to said camera.

4. In combination with a camera having a view finder aperture therein, a view finder comprising a sheet metal member comprising a front portion and two integral side portions, the lower edges of said side portions being cut away and channeled to form aligned grooves in angular relationship to said front plate and the upper edges of said side being bent to form aligned channels angularly disposed with respect to said grooves, and in substantially right angular relationship to said front portion, said front portion having an aperture therein, tongues integral with said member protruding into said apertures, a lens positioned between said aperture in said front portion and said aperture in said camera, said tongues serving to hold said lens in position when said view finder is secured to said camera, and means comprising tongues struck from the material of said camera to engage said front portion and hold said member in assembled relation with said camera.

JOHN K. POLHEMUS.